(12) United States Patent
Hsu

(10) Patent No.: US 8,478,094 B2
(45) Date of Patent: Jul. 2, 2013

(54) OPTOELECTRONIC TRANSMISSION DEVICE HAVING SOLAR CELL UNIT

(75) Inventor: Chia-Ling Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 226 days.

(21) Appl. No.: 13/090,268

(22) Filed: Apr. 20, 2011

(65) Prior Publication Data

US 2012/0155802 A1    Jun. 21, 2012

(30) Foreign Application Priority Data

Dec. 16, 2010  (TW) .................................. 99144158

(51) Int. Cl.
  *G02B 6/26*  (2006.01)
(52) U.S. Cl.
  USPC ................................. 385/47; 385/65; 385/83
(58) Field of Classification Search
  USPC ............................... 385/47, 65, 83
  See application file for complete search history.

(56) References Cited

U.S. PATENT DOCUMENTS

| | | | | |
|---|---|---|---|---|
| 4,712,065 A | * | 12/1987 | Pitt et al. .................... | 324/244.1 |
| 4,789,213 A | * | 12/1988 | Heywang et al. .................. | 385/1 |
| 4,989,934 A | * | 2/1991 | Zavracky et al. ............... | 385/14 |
| 5,043,573 A | * | 8/1991 | Banks ...................... | 250/227.24 |
| 5,485,538 A | * | 1/1996 | Bowen et al. ................... | 385/92 |
| 5,591,964 A | * | 1/1997 | Poole ........................ | 250/227.14 |
| 5,695,120 A | * | 12/1997 | Kingsford ..................... | 239/112 |
| 6,142,680 A | * | 11/2000 | Kikuchi et al. ................. | 385/93 |
| 6,213,651 B1 | * | 4/2001 | Jiang et al. ...................... | 385/92 |
| 6,406,196 B1 | * | 6/2002 | Uno et al. ....................... | 385/89 |
| 6,668,113 B2 | * | 12/2003 | Togami et al. .................. | 385/33 |
| 6,939,058 B2 | * | 9/2005 | Gurevich et al. ................ | 385/93 |
| 7,309,169 B2 | * | 12/2007 | Toillon et al. ................... | 385/88 |
| 7,325,982 B2 | * | 2/2008 | Aronson ......................... | 385/92 |
| 7,806,603 B2 | * | 10/2010 | Izumo et al. .................... | 385/89 |
| 8,273,271 B2 | * | 9/2012 | Hsu .............................. | 264/1.25 |
| 2007/0071393 A1 | * | 3/2007 | Robertson et al. ............ | 385/101 |

FOREIGN PATENT DOCUMENTS

JP    62151043 A  *  7/1987

* cited by examiner

*Primary Examiner* — Charlie Peng
(74) *Attorney, Agent, or Firm* — Altis Law Group, Inc.

(57) ABSTRACT

An optoelectronic transmission device includes an optical signal source, a light detector, a solar cell unit, and a power storage unit. The reflector covers the light detector and the optical signal source. The reflector is configured to internally totally reflect first light emitted from the optical signal source to a first optical fiber and reflect a first part of the second light from a second optical fiber to the light detector and reflect a second part of the second light to the solar cell unit. The light detector receives and converts the first part of the second light into electrical signals. The solar cell unit receives and coverts the second part of the second light into electrical energy. The power storage unit is electrically connected to the solar cell unit for storing the electric energy. The power storage unit powers the light detector and the optical signal source.

15 Claims, 5 Drawing Sheets

OPTOELECTRONIC TRANSMISSION DEVICE HAVING SOLAR CELL UNIT

BACKGROUND

1. Technical Field

The present disclosure relates to optoelectronic transmission devices having solar cell units.

2. Description of Related Art

An optoelectronic transmission device typically includes an optical signal source, a light detector, a first optical fiber for sending output optical signals emitted from the optical signal source and a second optical fiber for receiving and directing input optical signals to the light detector. The light detector converts the input optical signals into electrical signals. The optical signal source and the light detector consume electrical power. The electrical power may be provided by an outer power source, which may result inconvenient use of the optoelectronic transmission device.

Therefore, an optoelectronic transmission device, which can overcome the above-mentioned problems, is needed.

DETAILED DESCRIPTION

Figure 1:
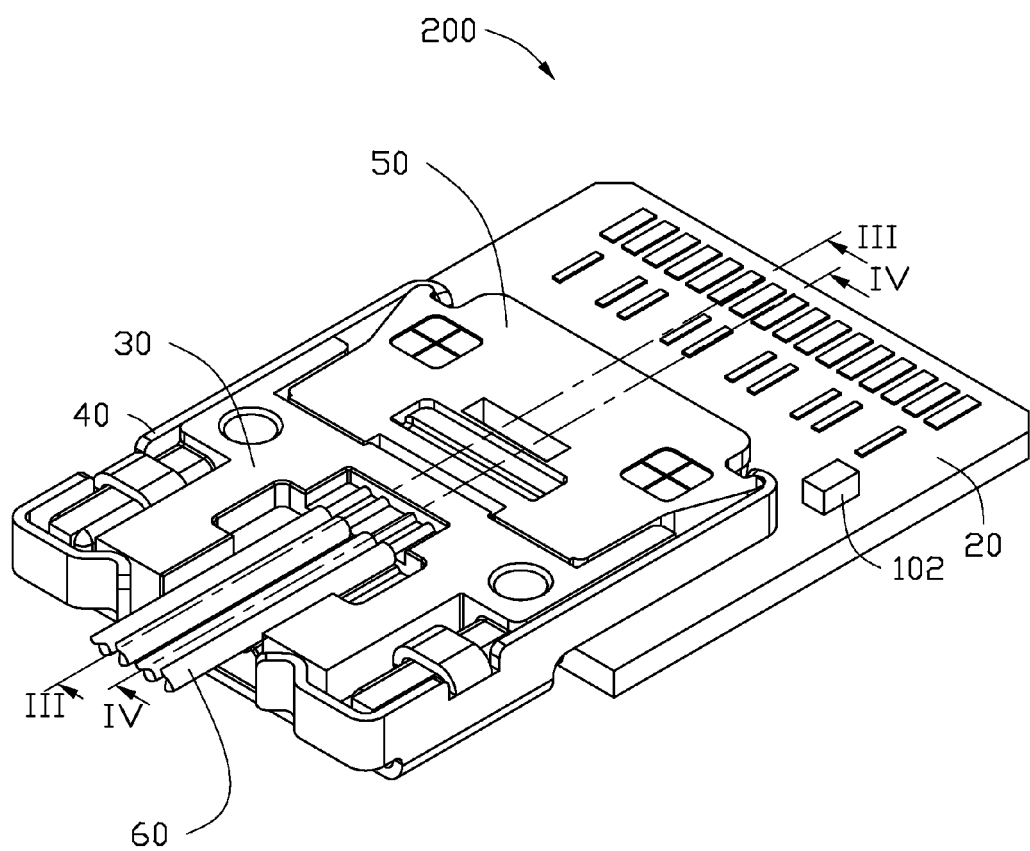
FIG. 1 is a schematic view of an optoelectronic transmission device, according to a first embodiment.
Figure 2:
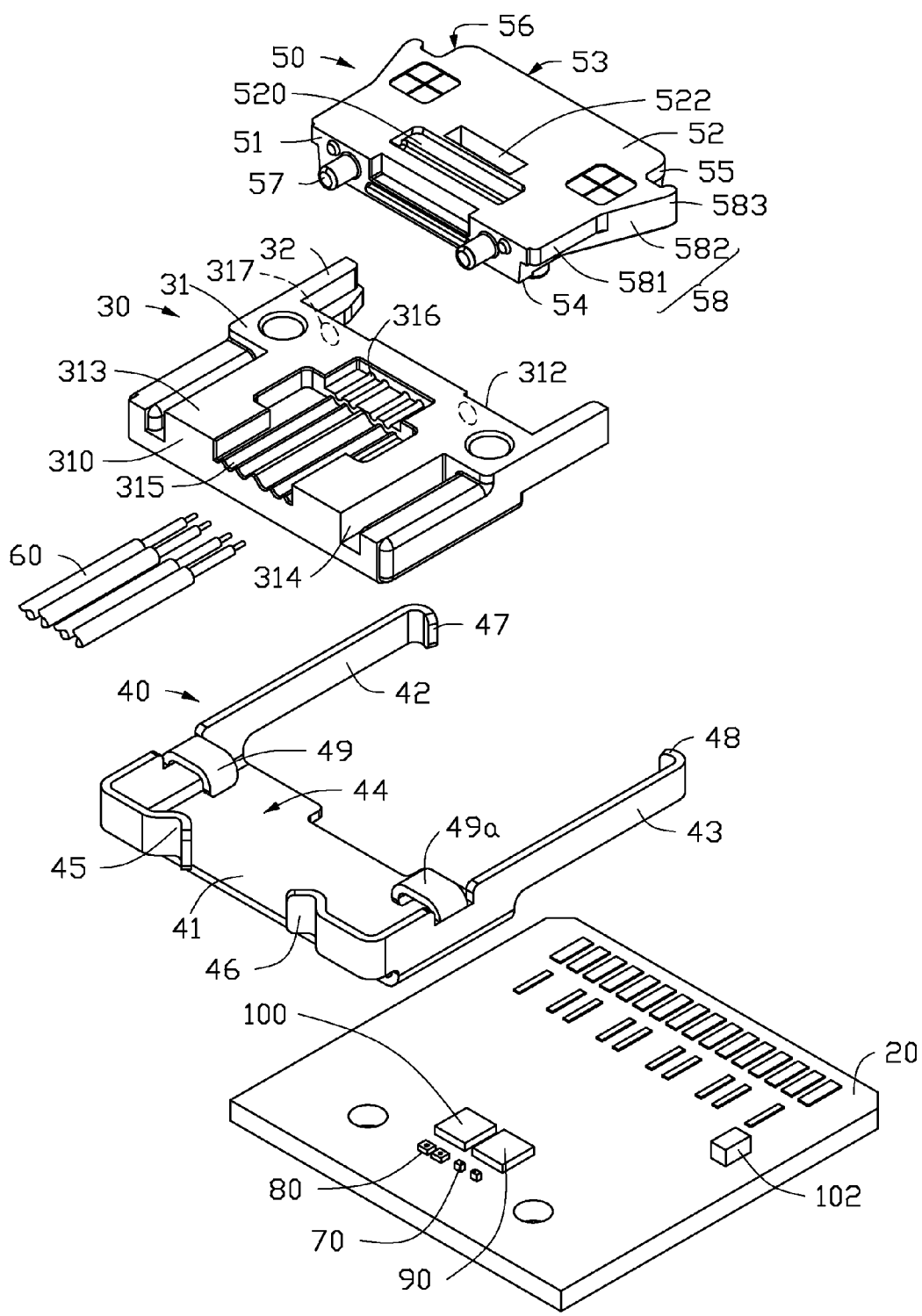
FIG. 2 is an exploded view of the optoelectronic transmission device of FIG. 1.
Figure 3:
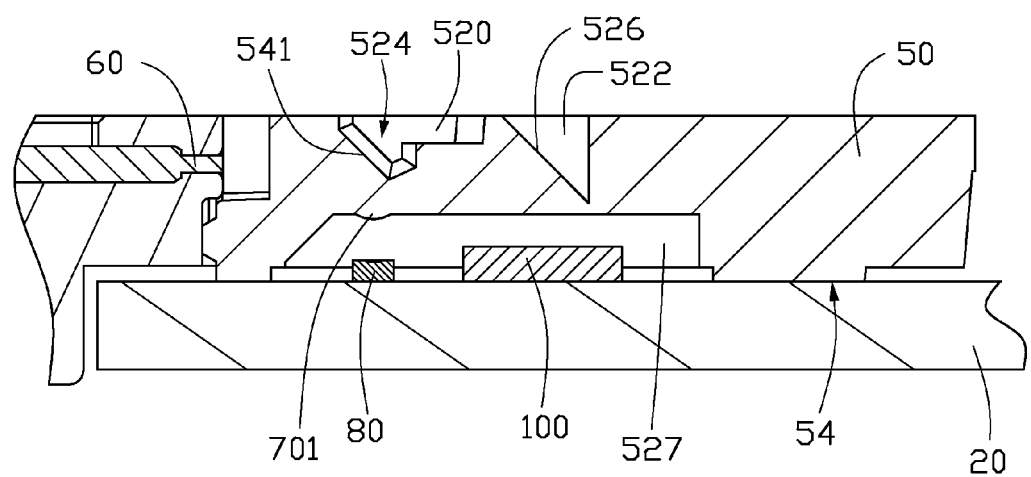
FIG. 3 is a sectional view taken along line III-III of the optoelectronic transmission device of FIG. 1.

Referring to FIGS. 1 to 4, an optoelectronic transmission device 200, according to a first embodiment, includes a base 20, an optical fiber carrier 30, a fastener 40, a reflector 50, four optical fibers 60, two optical signal sources 70, two light detectors 80, a processing unit 90, a solar cell unit 100, and a power storage unit 102.

The base 20 may be a printed circuit board. The optical signal sources 70, the light detectors 80, the processing unit 90, the solar cell unit 100, and the power storage unit 102 are positioned on the base 20 and electrically connected to the base 20.

The optical fiber carrier 30 includes a body 31, and two supports 32. The body 31 is substantially a cuboid and includes a first surface 310, a second surface 312 and a top surface 313. The top surface 313 connects the first surface 310 and the second surface 312. The first surface 310 and the second surface 312 are at opposite sides of the body 31.

Two fastening recesses 314 and four fiber receiving grooves 315 are defined in the top surface 313 and extend from the first surface 310 to the second surface 312. Four through holes 316 are defined from the first surface 310 to the second surface 312 and are in communication with the four fiber receiving grooves 315 respectively. The fiber receiving grooves 315 are arranged between the two fastening recesses 314 and support the four optical fibers 60 respectively.

The two supports 32 extend from the second surface 312 along a direction away from the first surface 310. The four through holes 316 are positioned between the two supports 32. Each support 32 is substantially L-shaped. Two positioning holes 317 are defined in the second surface 312. Each of the positioning holes 317 is between a corresponding support 32 and the through holes 316 on the second surface 312.

The fastener 40 includes a bottom plate 41, a first side plate 42 and a second side plate 43. The first side plate 42 and the second side plate 43 extend from the bottom plate 41 and are substantially parallel to each other. The bottom plate 41, the first side plate 42 and the second side plate 43 cooperatively form a receiving space 44 for receiving the optical fiber carrier 30.

A first tab 45 extends from one end of the first side plate 42 towards the second side plate 43. A first hook 47 extends from another end of the first side plate 42 towards the second side plate 43. A second tab 46 extends from one end of the second side plate 43 towards the first side plate 42. A second hook 48 extends from another end of the second side plate 43 towards the first side plate 42. A first guiding arm 49 extends from the first side plate 42 towards the second side plate 43 between the first tab 45 and the first hook 47. A second guiding arm 49a extends from the second side plate 43 towards the first side plate 42 between the second tab 46 and the second hook 48. The first tab 45 corresponds to the second tab 46. The first hook 47 corresponds to the second hook 48. The first guiding arm 49 corresponds to the second guiding arm 49a.

The first guiding arm 49 and the seconding guiding arm 49a are received in the respective fastening recesses 314. The first tab 45 and the second tab 46 abut against the body 31 of the carrier 30.

The reflector 50 includes a third surface 51, a reflector top surface 52, a fourth surface 53, a reflector bottom surface 54, a first side surface 55 and a second side surface 56. The third surface 51, the first side surface 55, the fourth surface 53 and the second side surface 56 are connected end-to-end to each other. The reflector top surface 52 and the reflector bottom surface 54 are connected to the third surface 51, the first side surface 55, the fourth surface 53 and the second side surface 56. The third surface 51 is substantially parallel to the fourth surface 53.

Two positioning posts 57 extend from the third surface 51 towards the second surface 312. Each positioning post 57 is securely received in the corresponding positioning hole 317. Two wings 58 extend from the first side surface 55 and the second side surface 56 respectively. Each wing 58 includes a front portion 581 and a rear portion 582. A thickness of the front portion 581, measured from the reflector bottom surface 54 to the reflector top surface 52, is smaller than that of the rear portion 582, measured from the reflector bottom surface 54 to the reflector top surface 52. The front portion 581 is supported on the corresponding support 32. The rear portion 582 includes a protrusion 583 at one end of the rear portion 582 adjacent to the fourth surface 53. The protrusion 583 is engaged in the corresponding hook 47(48). Therefore, the fastener 40 can secure the carrier 30 and the reflector 50 in place together.

A first recess 520 and a second recess 522 are defined in the reflector top surface 52 in that order from the third surface 51 and the fourth surface 53. The reflector 50 includes a first reflective surface 524 in the first recess 520 and a second reflective surface 526 in the second recess 522. The first reflective surface 524 is substantially parallel to the reflective surface 526. The first recess 520 and the second recess 522 are substantially elongated.

Figure 4:
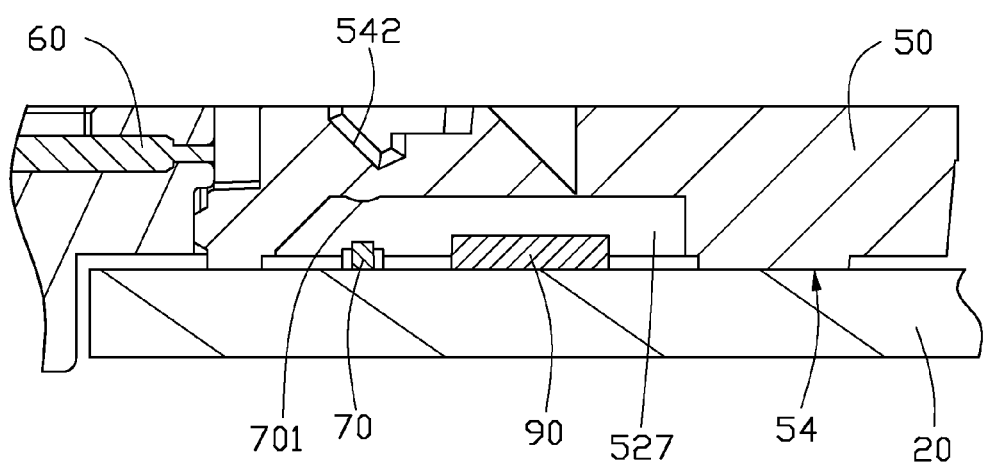
FIG. 4 is a sectional view taken along line IV-IV of the optoelectronic transmission device of FIG. 1.

The first reflective surface 524 includes a transflective portion 541 (see FIG. 3) and a internally-totally reflective portion 542 (see FIG. 4). The transflective portion 541 is capable of reflecting a first part of light and allowing a second part of the light to pass therethrough. The transflective portion 541 can be achieved by forming an optical film using physical vapor deposition or electron-beam gun evaporation on a corresponding portion of the first reflective surface 524 in the first recess 520. The internally-totally reflective portion 542 is capable of internally totally reflecting light impacting on the totally reflective portion 542. The internally-totally reflective portion 542 can be achieved by forming another optical film using physical vapor deposition or electron-beam gun evaporation on another corresponding portion of the first reflective surface 524 in the first recess 520.

The second reflective surface 526 is capable of internally-totally reflecting light impacting on the second reflective surface 526. The optical signal sources 70 and the light detectors 80 are arranged along a longitudinal direction of the first recess 520 on the base 20 and correspond to the first reflective surface 524. Specifically, the optical signal sources 70 correspond to the internally-totally reflective portion 542. The light detectors 80 correspond to the transflective portion 541. The light detectors 80 and the solar cell unit 100 are positioned on the base 20 in that order from the third surface 51 to the fourth surface 53.

A third recess 527 is defined in the reflector bottom surface 54 and corresponds to the first recess 520 and the second recess 522. The optical signal sources 70, the light detectors 80, the processing unit 90, and the solar cell unit 100 are received in the third recess 527. Four lenses 701 are formed on the reflector bottom surface 54 in the third recess 527. The four lenses 701 are corresponding to the two optical signal sources 70 and the light detectors 80. The first reflective surface 524, the lens 701 and the optical signal source 70/the light detector 80 are arranged along a light path associated with the optical signal source 70/the light detector 80.

The four optical fibers 60 are received in the receiving grooves 315, respectively. Inclined angles of the first reflective surface 524 and the second reflective surface 526 are about 45 degrees with respective to the optical fiber 60 in the receiving groove 315. Two of the optical fibers 60 are configured to output first light (optical signals) emitted from the optical signal sources 70 and another two of the optical fibers 60 are configured to transmit second light (optical signals) to the light detectors 80. Two of the lenses 701 are configured to direct the first light into the two of the optical fibers 60 from the optical signal sources 70. Another two of the lenses 701 are configured to direct a first part of the second light into the light detectors 80 from the another two of the optical fibers 60. The light detectors 80 are configured to convert the first part of the second light into electrical signals. The second light may have a wavelength of about 850 nm. The processing unit 90 is electrically connected to the optical signal sources 70 and the light detectors 80. The processing unit 90 is configured to control the optical signal sources 70 to emit the first light and receive the electrical signals from the light detectors 80. The electrical signals can be used for data/instructions transmission.

The solar cell unit 100 is positioned correspondingly to the second reflective surface 526 and is electrically connected to the power storage unit 102. In this embodiment, the solar cell unit 100 is comprised of GaAs. The solar cell unit 100 is configured to receive light reflected by the second reflective surface 526 and covert the light into electrical energy. The power storage unit 102 stores the electrical energy. The processing unit 90, the light detectors 80 and the optical signal sources 70 are electrically connected to the power storage unit 102. The power storage unit 102 can power the processing unit 90, the light detectors 80 and the optical signal sources 70, if needed.

When in use, the processing unit 90 controls the optical signal sources 70 to emit the first light. The first light is directed by the two of the lenses 701 into the internally-totally reflective portion 542. The internally-totally reflective portion 542 totally reflects the first light into the two of the optical fibers 60. The two of the optical fibers 60 transmit the first light to other devices. Therefore, optical signals can be transmitted to other devices in light form.

The another two of the optical fibers 60 transmit the second light from the other devices. The second light then impacts on the transflective portion 541. The transflective portion 541 reflects a first part of the second light to the another two of the lenses 701 and allows a second part of the second light to pass therethrough toward the second reflective surface 526. The another two of the lenses 701 directs the first part of the second light the light detectors 80. The light detectors 80 convert the first part of the second light into electrical signals. The second reflective surface 526 internally totally reflects the second part of the second light to the solar cell unit 100. The solar cell unit 100 convert the second part of the second light into electrical energy. The power storage unit 102 stores the electrical energy.

Figure 5:
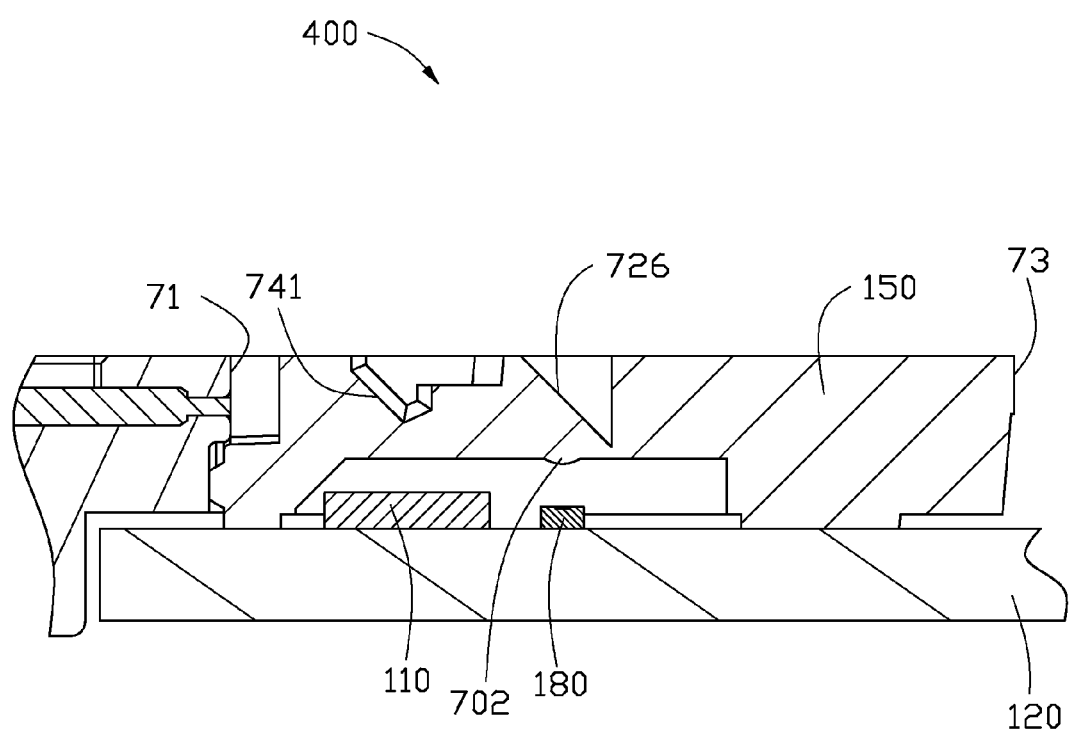
FIG. 5 is a sectional view of an optoelectronic transmission device of FIG. 1.

Referring to FIG. 5, an optoelectronic transmission device 400, according to a second embodiment, is shown. The differences between the optoelectronic transmission device 400 and the optoelectronic transmission device 200 are that positions of light detectors 180, a solar cell unit 110 and two of four lenses 702 differs.

In this embodiment, the light detectors 180 correspond to a second reflective surface 726 of a reflector 150. The second reflective surface 726, the two of the lenses 702 and the light detectors 180 are arranged along a light path associated with the light detector 180. The solar cell unit 110 is positioned correspondingly to a transflective portion 741 of the reflector 150. The solar cell unit 110 and the light detectors 80 are positioned on a base 120 in that order from a third surface 71 to a fourth surface 73 of the reflector 150.

Usages of the optoelectronic transmission device 400 of this embodiment are substantially the same as those of the optoelectronic transmission device 200 of the first embodiment.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optoelectronic transmission device, comprising:
a base;
a first optical fiber configured to transmit first light;
a second optical fiber configured to transmit second light;
an optical signal source positioned on the base and configured to emit the first light;
a light detector positioned on the base and configured to receive and convert a first part of the second light into electrical signals;
a solar cell unit positioned on the base and configured to receive and covert a second part of the second light into electrical energy;
a carrier positioned on the base, the carrier comprising a body and two supports, the body comprising a first surface, a second surface and a top surface, the top surface connecting the first surface and the second surface, the first surface and the second surface being at opposite sides of the body, the carrier having a first through hole and a second through hole, the first through hole and the second through hole being defined from the first surface to the second surface, two fastening recesses and two fiber receiving grooves being defined in the top surface and extend from the first surface to the second surface, the two fiber receiving grooves arranged between the two fastening recesses and in communication with the first through hole and the second through hole respectively, the first optical fiber received in the first through hole, the second optical fiber received in the second through hole;

a reflector positioned on the base and covering the light detector and the optical signal source, the reflector configured to internally totally reflect the first light emitted from the optical signal source to the first optical fiber and reflect the first part of the second light from the second optical fiber to the light detector and reflect the second part of the second light to the solar cell unit; and a power storage unit electrically connected to the solar cell unit for storing the electric energy, the power storage unit configured to power the light detector and the optical signal source.

2. The optoelectronic transmission device of claim 1, wherein two positioning holes are defined in the second surface, the first through hole and the second through hole arranged between the two positioning holes.

3. The optoelectronic transmission device of claim 2, wherein the reflector comprises two position posts, a third surface, and a fourth surface, the third surface and the fourth surface being substantially parallel to each other and being at opposite sides of the reflector, the two positioning posts extending from the third surface towards the second surface, and each positioning post is securely received in the corresponding positioning hole.

4. The optoelectronic transmission device of claim 3, wherein the reflector comprises two wings, a first side surface and a second side surface, the first side surface and the second side surface connecting the third surface to the fourth surface, one of the two wings extending from the first side surface, another of the two wings extending from the second side surface, each of the wings comprising a front portion adjacent to the third surface and a rear portion adjacent to the fourth surface, the front portions being supported on the corresponding supports.

5. The optoelectronic transmission device of claim 4, further comprising a fastener, the fastener comprising a bottom plate, a first side plate and a second side plate extending from the bottom plate, the first side plate having a first tab extending from one end of the first side plate, a first hook extending from another end of the first side plate and a first guiding arm extending from first side plate between the first tab and the first hook, the second side plate having a second tab extending from one end of the second side plate, a second hook extending from another end of the second side plate and a second guiding arm extending from the second side plate between the first tab and the first hook.

6. The optoelectronic transmission device of claim 5, wherein the first guiding arm and the second guiding arm are received in the respective fastening recesses.

7. The optoelectronic transmission device of claim 5, wherein the first tab and the second tab abut against the first surface of the body.

8. The optoelectronic transmission device of claim 5, wherein each of the rear portions comprises a protrusion at one end thereof adjacent to the fourth surface, the protrusion engaged in the corresponding hook.

9. The optoelectronic transmission device of claim 1, further comprising a processing unit, configured to control the optical signal source to emit the first light and receive the electrical signals from the light detector.

10. The optoelectronic transmission device of claim 4, wherein the reflector comprises a top surface, a bottom surface, a first recess and a second recess, the top surface and the bottom surface connecting the third surface, the fourth surface, the first side surface and the second side surface, the first recess and the second recess are defined in the top surface.

11. The optoelectronic transmission device of claim 10, wherein the reflector comprises a first reflective surface in the first recess and a second reflective surface in the second recess, the first reflective surface being substantially parallel to the reflective surface.

12. The optoelectronic transmission device of claim 11, wherein the first reflective surface includes a transflective portion and a internally-totally reflective portion, the transflective portion being capable of reflecting the first part of the second light to the light detector and allowing the second part of the second light to pass therethrough toward the second reflective surface, the internally-totally reflective portion being capable of internally totally reflecting the first light towards the first optical fiber.

13. The optoelectronic transmission device of claim 12, wherein the second reflective surface is capable of internally-totally reflecting the second part of the second light towards the solar cell unit.

14. The optoelectronic transmission device of claim 11, wherein the first reflective surface includes a transflective portion and a internally-totally reflective portion, the transflective portion being capable of reflecting the first part of the second light to the solar cell unit and allowing the second part of the second light to pass therethrough toward the second reflective surface, the internally-totally reflective portion being capable of internally totally reflecting the first light towards the first optical fiber.

15. The optoelectronic transmission device of claim 14, wherein the second reflective surface is capable of internally-totally reflecting the second part of the second light to the light detector.

* * * * *